UNITED STATES PATENT OFFICE.

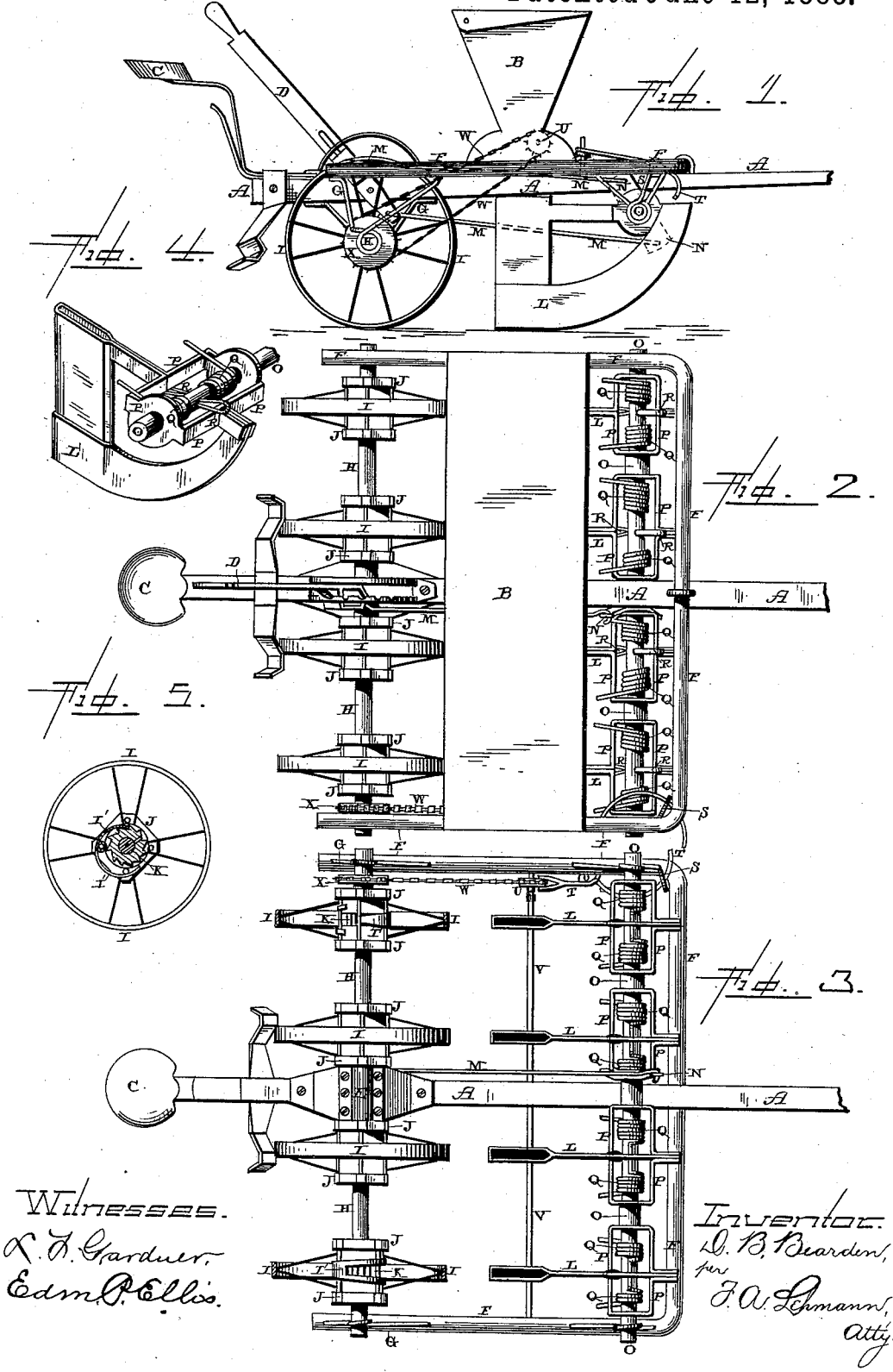

DANIEL B. BEARDEN, OF WILSON, KANSAS.

GRAIN-DRILL.

SPECIFICATION forming part of Letters Patent No. 384,499, dated June 12, 1888.

Application filed March 13, 1888. Serial No. 267,080. (No model.)

*To all whom it may concern:*

Be it known that I, DANIEL B. BEARDEN, of Wilson, in the county of Ellsworth and State of Kansas, have invented certain new and useful Improvements in Grain-Drills and Seeding-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in grain-drills and seeding-machines; and it consists in, first, a rigid tongue, which is secured to the frame at the front, extends backward under the seed-box and beyond the shaft upon which the covering-wheels are placed, and which forms a bearing not only for the driver's seat, but for the operating-lever, which operates the raising of the drills or furrow-openers and the shutting off of the flow of the seed from the seed-box; second, the combination of the shaft which extends across under the front of the frame, a series of furrow-openers or drills pivoted upon the shaft, springs connected to the shaft and which returns the drills or furrow-openers to position after having been raised, and a stop for each drill or furrow-opener to limit the distance that it shall move downward when left free to return to position; third, the combination of the covering-wheels, the axle upon which they are placed, the stationary ratchet-wheels secured to the shaft, and the pawls connected to the double hubs of the wheels, all of which will be more fully described hereinafter.

The objects of my invention are to use a stiff tongue, which extends backward sufficiently far to form a support for the driver's seat, and a fulcrum, upon which the operating-lever moves; to provide the covering-wheels with ratchets and pawls, so that they will operate the axle upon which they are placed as the machine moves forward, and thus operate the seeding mechanism, but which pawls and ratchets allow the wheels to move freely backward without operating the axle when the machine is being turned around, and to attach the furrow-openers or drills to the shaft, upon which they are pivoted by means of springs and stops, so that when they strike against an obstruction they will freely rise to pass over it and then snap back into position.

Figure 1 is a side elevation of a machine embodying my invention. Fig. 2 is a plan view.
Fig. 3 is an inverted view. Fig. 4 is an enlarged perspective of one of the drills and its connection with the rod to which it is attached.
Fig. 5 is a vertical section through one of the covering-wheels.

A represents the tongue, which has its rear end to extend solidly back under the seed-box B, and to form a support at its rear end for the driver's seat C and the operating-lever D.
To the under side of this tongue is secured a bearing, E, which serves to brace and strengthen the axle upon which the covering-wheels are placed; also secured to the rear end of the tongue is the foot-support for the driver.

The seed-box B is mounted upon the frame F, which is made of a single bent rod or tube, which is shaped as shown, and which is secured to the top of the tongue A, at its front, and has its rear ends supported by the bearings G, in which the axle for the covering-wheels revolves. This frame F is very light, cheap, strong, and durable, and greatly decreases the cost of the seeder over the construction of the ordinary frame heretofore used, at the same time that the parts are made much lighter and more durable.

The axle H, which is journaled in the bearings E G, has placed upon it a number of covering-wheels, I, each one of which is provided with a double hub, J, and each wheel is held in position upon the axle H by means of a ratchet-wheel, K, which is rigidly secured to the axle H in between the two parts of the hub. Secured to the two hubs of each wheel is a spring-actuated pawl, I', which engages with the ratchet-wheel so as to compel the axle H to revolve when the machine is drawn forward, but which allows the wheels to revolve freely backward without affecting the axle while the machine is being turned around or backed. These wheels I follow just behind the drills or furrow-openers L and cover the seed as fast as it is deposited in the ground.
By using two hubs, J, to each wheel the ratchet-wheel can be placed between them, and the wheels I thus prevented from having any lateral movement upon the axle, at the same time that the hubs enable the strain upon the pawls to be evenly divided between the two hubs, thus preventing any uneven strain upon any of the parts.

The lever D, pivoted upon the rear end of the tongue A, has the two connecting-rods, M, pivoted to it, one upon each side of its center of motion, and the front ends of these rods are fastened to arms N, which are rigidly secured to the shaft O, the arms being made to project beyond opposite sides of this shaft O, so that while one of the rods is exerting a pull the other one is exerting a push for the purpose of causing the shaft to partially revolve. When the upper end of the lever D is forced forward toward the seed-box B, the shaft O is made to revolve forward and raise the drills or furrow-openers L above the ground, and when the lever is drawn backward the shaft is revolved forward, so as to force the furrow-openers or drills downward to any desired distance. To the front end of each furrow-opener L is secured an angular frame, P, through which the shaft O passes, and inside of this angular frame P, around the shaft, is secured a spiral spring, Q, which is held rigidly in position at its center by the stop R, and which has its ends to catch against the edges of the frame P. The stop R consists of suitable rods, which are bent at their ends, as shown, extend a suitable distance beyond opposite sides of the shaft O, and catch above and below opposite edges of the angular frame P, in order to cause the frames P and the drills or furrow-openers L to move with the shaft O when it is turned by the operating-lever D and rods M. These stops R do not prevent the drills or furrow-openers L from rising when they encounter an obstruction, but do limit the distance that they shall move down in being returned to position by the springs Q. The drills or furrow-openers L can freely turn backward upon the shaft O for the purpose of allowing the drills to rise freely over any obstruction which may be in the way as the machine is drawn forward; but as soon as the obstruction is passed the springs instantly force the drills down until opposite sides of the frames P strike against the stops R. As above stated, the stops R cause the drills to be raised upward when the shaft is revolved forward; but do not effect the drills when the shaft is turned backward, for then the springs Q are brought into play and they force the drills toward the ground as far as the stops will allow.

The shaft O is journaled in suitable boxes which project down from the under side of the frame F, and extending from one end of the shaft O is the arm or lever S, having an eye at its outer end. Passing through this eye is the pivoted lever T, which has its rear end connected with the clutch U, placed upon the shaft V, which extends along under the seed-box and which operates the seeding devices. The clutch is provided with teeth, so as to receive motion from the chain W, which is operated by the wheel X upon the shaft H. While the machine is being drawn forward, the shaft H is made to revolve by the wheels I, and this motion is transferred through the wheel X and chain W to the clutch. When the upper end of the lever D is moved forward so as to turn the shaft O forward, the lever S is moved at the same time, and this lever, acting upon the curved front end of the lever T, throws the clutch out of operation, so as to stop the flow of seed from the hopper. In raising the drills from the ground the clutch is operated at the same time and the flow of seed instantly stopped. By this construction all necessity for having to operate the seeding mechanism separately is entirely done away with, and the seeding mechanism is thrown into or out of gear by the mere raising or lowering of the drills.

Having thus described my invention, I claim—

1. The combination of the frame of the machine, the axle H, journaled in suitable boxes, the ratchet-wheels rigidly secured to the axle, the covering-wheels I, provided with double hubs J, which catch upon opposite sides of the ratchet-wheels, and the spring-actuated pawls secured to the hubs and which engage with the ratchet-wheel, substantially as set forth.

2. The combination of the shaft O, the drills or furrow-openers provided with frames at their front ends, the stops which are passed through the shaft, and the springs which are applied to the shaft and which return the furrow-openers to position after having been raised, the arm connected to the shaft, and the operating-lever and connecting-rods, substantially as specified.

3. The combination of the clutch U, the pivoted curved lever T, connected thereto, the shaft O, the arm or lever S, which is connected to the shaft and which engages with the lever T, the operating-chain W, the wheel X, shaft H, and the operating-lever for moving the shaft O, substantially as shown and described.

4. The combination of the operating-lever, the connecting rod or rods extending therefrom, the shaft O, and arm extending therefrom and making connection with the connecting rod or rods, the seed-drills or furrow-openers connected at their front ends to the shaft O, stops connected to the shaft for moving the seed-drills in one direction, and the springs for returning the seed-drills to position when left free to move, substantially as set forth.

In testimony whereof I affix my signature in presence of two witnesses.

DANIEL B. BEARDEN.

Witnesses:
M. H. ALDERSON,
EBENEZER MOYER.